UNITED STATES PATENT OFFICE.

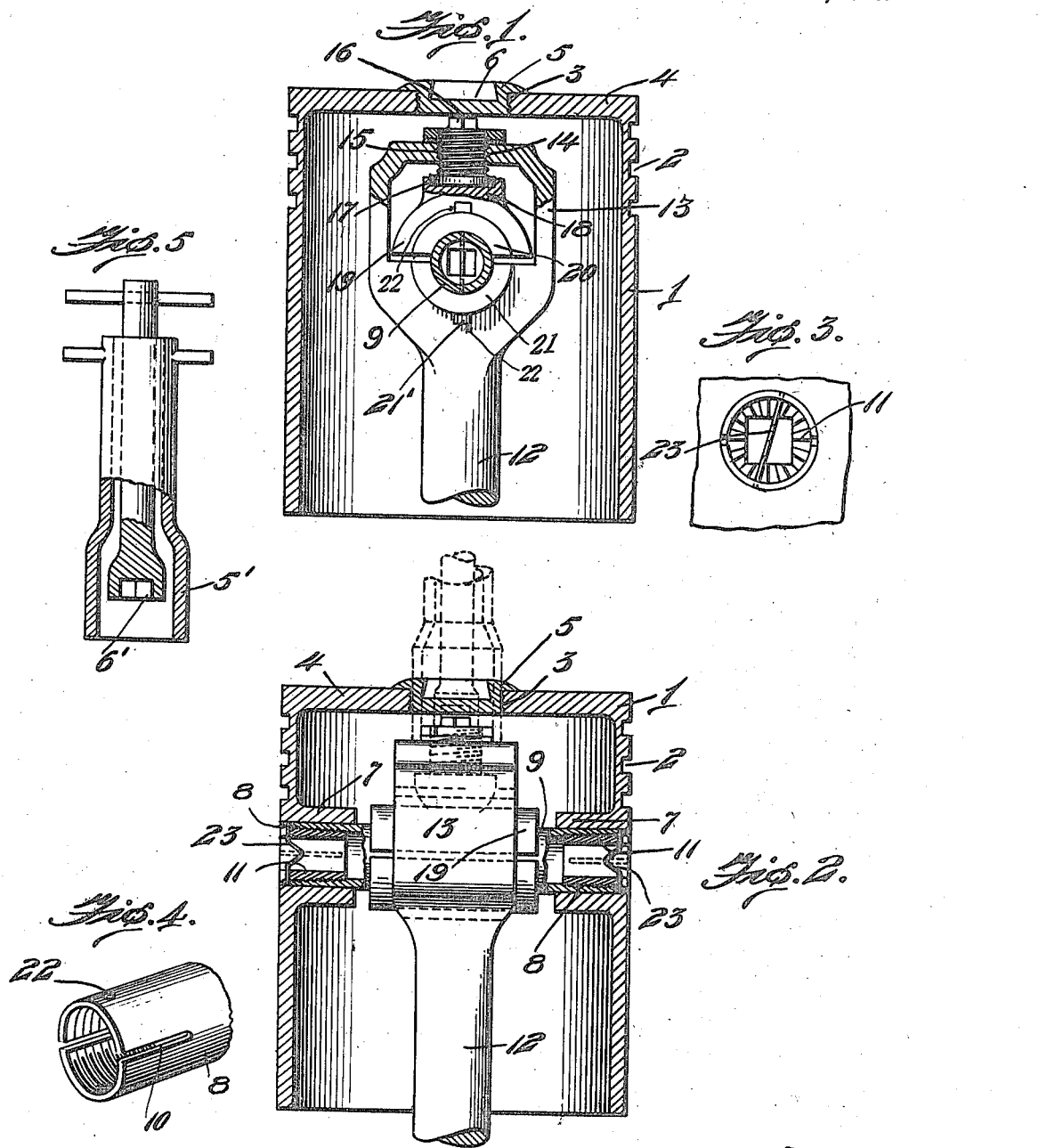

WILLIAM B. ROYER, OF BALTIMORE, MARYLAND, ASSIGNOR OF ONE-HALF TO EUGENE B. LINK, OF BALTIMORE, MARYLAND.

ADJUSTABLE WRIST-PIN AND BEARING THEREFOR.

1,268,282.  Specification of Letters Patent.  Patented June 4, 1918.

Application filed March 15, 1917. Serial No. 155,034.

*To all whom it may concern:*

Be it known that I, WILLIAM B. ROYER, a citizen of the United States, residing at Baltimore, State of Maryland, have invented certain new and useful Improvements in Adjustable Wrist-Pins and Bearings Therefor, of which the following is a specification, reference being had therein to the accompanying drawing.

This invention relates to new and useful improvements in bearings used in combination with connecting rods, and more particularly to bearings adapted to permit readjustment thereof to compensate for wear.

The main feature of the present invention resides in the provision of means for permitting the ready adjustment of the bearing from the top of the cylinder without the necessity of removing the piston from the cylinder.

A further object is to provide a device of this character which will permit of such adjustment while the connecting rod is in its operative position or within the piston.

A still further object of the invention is to construct a bearing whereby the wear upon the bearing surfaces will be taken up and a proper fit between the rotating member and parts between which it is journaled will be maintained by a simple adjustment throughout the life of the engine.

The invention comprises various other details of construction, combinations and arrangements of parts which will be hereinafter fully described, shown in the accompanying drawings and then specifically defined in the appended claims.

I illustrate my invention in the accompanying drawings, in which:

Figure 1 is a sectional view of a piston and a connecting rod secured thereto.

Fig. 2 is a sectional view taken at right angles to Fig. 1.

Fig. 3 is a face view of one of the ends of the wrist pins.

Fig. 4 is a detail view of one end of the wrist pin, and

Fig. 5 is an elevation, partly in section, of the wrench especially adapted for use with my invention.

Reference now being had to the details of the drawings by numerals, 1 designates a piston having suitable piston ring grooves 2, and an upper central threaded opening 3, arranged centrally of the head 4, said opening being closed by a cap or threaded plug 5 having a depression 6 for the reception of the suitable wrench, shown in Fig. 5, said wrench having suitably constructed jaws 5' and 6'.

In the piston 1 are openings or bearings 7, disposed at diametrically opposite points, in which are positioned the ends 8 of the wrist pin 9, the ends 8 having longitudinal slots 10 and to permit expansion thereof, being interiorly threaded to receive the tapered expanding cones 11. It will thus be seen that, when the cones 11 are properly positioned within the ends 8 of the wrist pin 9, the exterior walls of the ends 8 are forced into frictional contact with the bearings 7 and the wrist pin is thereby securely positioned within the piston 1.

Pivotally connected to the wrist pin 9 is the usual connecting rod 12 having a yoke 13 which is provided with a threaded opening 14 to receive the threaded nut 15, the threaded nut 15 being also provided with a squared portion 16 to permit the same to be engaged by a suitable wrench in the event that an adjustment is to be made. This nut 15 has a circular enlargement 17 on its lower end fitting in a suitable circular depression 18 formed in the upper bearing block 19, the under side of which is curved to receive a correspondingly curved bearing member 20. The bearing member 20 coöperates with a similarly curved bearing member 21 for embracing the wrist pin 9 and forming the complete bearing for the connecting rod 12. As clearly shown in the drawing, the bearing member 21 seats in a curved portion 22 of the connecting rod 12 and forms the stationary section of the wrist pin bearing. Each of the bearing members 20 and 21 is provided with an extension 21' seated in suitable recesses 22' in order that circumferential movement thereof with relation to the wrist pin 9 will be obviated.

In order to insure the expanding cones 11 from becoming displaced, I have provided openings 22 adjacent to the ends of the wrist pin 9, which openings accommodate the ends of the expansion springs 23, the same engaging the outer edge of the expansion nuts 11 and thereby preventing rotary movement thereof.

In the event of the wrist pin 9 becoming worn, it will be seen that it is only necessary to remove the plug or cap 5, insert a suitable tool in the openings 3 and rotate the member 15 with the result that the bearing 20 is again moved into engagement with the wrist pin 9 and all lost motion obviated.

What I claim to be new is:—

1. In combination, a hollow piston having a central opening in the head thereof, a wrist pin connecting the inner walls thereof, a connecting rod connected to the wrist pin, a stationary and a movable bearing member carried by the connecting rod, and means for moving the movable bearing member into engagement with the wrist pin to compensate for wear, said means being accessible through the central opening.

2. In combination, a hollow piston having an opening in the head thereof, a wrist pin in the piston, a connecting rod having an apertured yoke, a stationary bearing member carried by the connecting rod, a threaded nut positioned in the opening of the yoke, said nut having a circular enlargement, a bearing block having a recess to receive the circular enlargement, said bearing block embracing a bearing member, means on the threaded nut to permit the same to be rotated and thereby adjust the same with relation to the stationary bearing member, said means being accessible through the opening in the piston head.

3. In combination, a hollow piston rod having oppositely disposed bearings, a wrist pin having expansible ends, positioned in the bearings, an expanding cone in each end of the wrist pin, a connecting rod having one end pivotally connected to the wrist pin, and an adjustable bearing member for compensating for wear of the wrist pin.

4. In combination, a hollow piston, a wrist pin in the piston, a connecting rod connected to the wrist pin, an adjustable bearing interposed between the wrist pin and connecting rod, said piston having means to permit access to the adjustable bearing without removing the connecting rod from the piston.

In testimony whereof I hereunto affix my signature in presence of two witnesses.

WILLIAM B. ROYER.

Witnesses:
 FRANKLIN HOUGH,
 A. R. FOWLER.